3,240,720
BIFUNCTIONAL MONOMERS AND PROCESS FOR
THEIR PRODUCTION
George H. Smith, Maplewood, Minn., assignor to Minnesota Mining and Manufacturing Company, St. Paul, Minn., a corporation of Delaware
No Drawing. Filed Apr. 22, 1960, Ser. No. 23,905
10 Claims. (Cl. 260—2)

This invention relates to reactive, bifunctional nitrogenous compounds containing two ring structures, each of which is capable of undergoing addition reaction, said ring structures varying from each other in reactivity. More particularly, it relates to novel and useful epoxypropyl derivatives of aziridines (alkylenimines), their polymers and to a process for producing the same.

This application is a continuation-in-part of my copending application Serial Number 663,615 filed June 5, 1957, now abandoned.

While numerous monomeric compounds containing ethylenimine rings have been prepared, and polymers have been produced therefrom, the monomeric compounds of the invention and their useful polymeric derivatives are novel.

It is an object of the present invention to provide relatively stable, pure, reactive monomers capable of being easily polymerized to produce useful homo-and co-polymers.

It is also an object of the present invention to provide suitably pure and stable epoxypropylaziridine monomers which can be stored over extended periods of time under normal storage conditions without undergoing substantial polymerization or decomposition, and which may be controllably polymerized when desired.

It is another object of the present invention to provide thermosetting curable resin mixtures, including inter alia liquid, solvent-free compositions which cure smoothly and at relatively low temperatures and which when cured produce tough, dense resinous or elastomeric solids which form valuable protective coatings for common materials of construction such as, for example, wood, glass or metals.

It is a further object of the invention to provide homopolymers and copolymers which are useful in various areas in the field of resin technology, e.g., in encapsulation and potting applications (including electrical component encapsulation and potting), in castings, moldings laminants, adhesives, sealants, rubber applications such as gaskets, cap seals, etc.

Another and one of the principal objects of the present invention is to provide an efficient and inexpensive process for producing the novel and valuable reactive N-(2,3-epoxypropyl) aziridines of the invention having sufficient purity to permit a satisfactory shelf life under normal conditions of storage.

Additional objects will be apaprent from the disclosures made in the specification which follows.

The N-(2,3-epoxypropyl)-2-alkylaziridines of the invention can be represented by the formula:

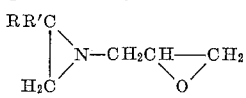

wherein R is a branched or straight chain lower alkyl radical (i.e. one containing up to 8 carbon atoms, such as methyl, ethyl, propyl, isopropyl, n-butyl, isobutyl, t-butyl, hexyl and octyl) and R' is hydrogen or a lower alkyl radical containing up to eight carbon atoms as in the case of R. R and R' prefrably do not contain more than 2 carbon atoms each. Illustrative of the N-(2,3-epoxypropyl)-aziridines included within the scope of the invention are N-(2,3-epoxypropyl)-2,2-dimethylaziridine, having the formula:

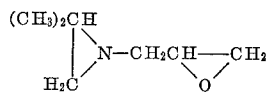

and N-(2,3-epoxypropyl)-2 ethyl-aziridine, having the formula:

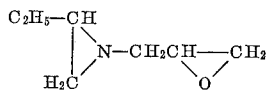

These compounds may also be designated as N-(2,3-epoxypropyl)-2,2-dimethyl-1,2-ethylenimine and N-(2,3-epoxypropyl)-2-ethyl-1,2-ethylenimine, respectively.

Other compounds in accordance with the present invention are: N-(2,3-epoxypropyl)-2-propylaziridine, N-(2,3-epoxypropyl)-2-n-butyl-aziridine, N-(2,3-epoxypropyl)-2-isopropylaziridine, N-(2,3-epoxypropyl)-2-methyl, 2-ethylaziridine, N-(2,3-epoxypropyl)-2-ethyl, 2-propyl-aziridine, N-(2,3-epoxypropyl)-2-isopropyl, 2-t-butylaziridine, N-(2,3-epoxypropyl)-2,2-di-t-butyl-aziridine, N-(2,3-epoxypropyl)-2-hexylaziridine and N-(2,3-epoxypropyl)-2-octylaziridine, among others.

The monomeric compounds of the invention are unusual in that they are characterized by two reactive but different groups or rings in each molecule: an aziridine ring,

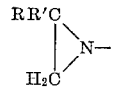

and an oxirane ring,

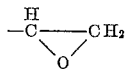

In other words, they are simultaneously an epoxide (oxirane) and an aziridine. These rings open when the compounds are subjected to heat or to the action of an acidic or basic promoter to produce various polymeric materials. Thus the N - (2,3 - epoxypropyl) - aziridine monomers, which are liquids at room temperature, polymerize easily and controllably with essentially no dimensional change to form clear, transparent, non-crystalline, thermosetting homopolymers having useful properties at high temperatures and exhibiting excellent adhesion to a variety of structural materials including glass and ceramics. The rate of polymerization to form the homopolymers can be enhanced by employing an acidic or basic polymerization catalyst such as para-toluene-sulfonic acid, phthalic anhydride, Friedel-Crafts type catalysts, e.g., aluminum chloride, stannic chloride or zinc chloride, the mineral acids, such as hydrochloric, sulfuric or phosphoric acid, borontrifluoride molecular addition products such as $BF_3$ monoethylamine, at or above room temperature, to bring about their polymerization to form polymeric resinous materials.

In addition to producing homopolymers of the monomers of the invention, copolymers may be produced by reacting the monomers with one or more other organic compounds containing a plurality of active hydrogen atoms. The term "active hydrogen atoms" refers to hydrogens which, because of their position in the molecule, display activity according to the well known Tschugaeff-Zerewitinoff test as described by Kohler, Stone and Fuson in J. Am. Chem. Soc., 49 3181 (1927). Certain of the monomers of this inventions, e.g., those in which R' is hydrogen, are also capable of acting as cross linking and chain extending agents for linear thermoplastic and elastomeric polymers which contain active hydrogen, to produce 3-dimensional polymer networks; thereby providing solid materials having excellent physical and chemical properties.

These polymeric materials have varied uses in the rubber, plastics, resinous molding, casting, encapsulation, potting, coating, sealant and adhesive arts. For example, the cured homopolymers of the invention are hard, clear and scratch-resistant resins which exhibit excellent adhesion to such materials as ceramics and glass. These homopolymers have utility as encapsulating resins for electronic circuits where it is often necessary to inspect the encapsulated components. Additionally, transparency of the polymeric resin is often needed for other reasons such as, for example, in optical adhesives where transparency both enhances appearance and permits necessary transmission to light. The ease of bulk polymerizing the monomers in accordance with this invention is also advantageous in that a 100 percent solids resin syrup can be obtained which will pour at relatively low temperatures and yet cure in place without appreciable bubbling or shrinking.

While the properties of the homopolymers and copolymers of the invention, and consequently the applications to which they are best suited, vary widely, it has been found that all of them form valuable protective and/or decorative coatings which embody the properties of the polymers, e.g., good adhesion to common materials of construction such as wood, ceramics, glass and metals, inertness with respect to such materials and a high degree of resistance to weathering, water and high humidity.

The present invention further comprises the process of producing the N-(2,3-epoxypropyl)-aziridine monomers of the invention. In accordance with this process a 1,2-alkylenimine having a hydrogen atom attached to the nitrogen of the three membered ring and containing at least 3 carbon atoms and desirably not more than 10 carbon atoms, such as 1,2-propylenimine, 1,2-butylenimine, 1,2-pentylenimine, 1,2-hexylenimine, 2-methyl-1,2-propylenimine or 2-isobutyl-1,2-hexylenimine, is reacted with an epihalohydrin to form an intermediate halohydrin derivative, which upon treatment with strong alkali loses the elements of hydrogen halide, thus effecting ring closure to produce the N-(2,3-epoxypropyl)aziridine compounds of the invention. The strongly alkaline materials employed are exemplified by the alkali-metal, ammonium and alkaline-earth metal hydroxides, such as sodium, potassium, lithium, calcium, magnesium hydroxides, and the like. The following series of equations, wherein R and R' have the significance set forth hereinabove and X represents a halogen, illustrates the probable course of the reaction:

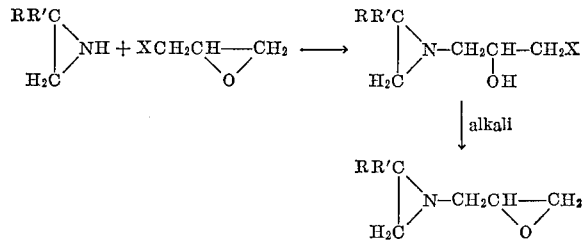

The 1,2-alkylenimines are preferably reacted with the epihalohydrin in the presence of an amount of water and the reaction mixture is then treated directly with the alkali. The amount of water used is not critical, as it apparently functions in the reaction as an aid in the initial opening of the epoxy ring during the course of the addition step of the reaction.

Although other epihalohydrins, such as epibromohydrin and epiiodohydrin, may be used, epichlorohydrin is presently preferred.

The selected 1,2-alkylenimine is employed in a ratio of about one mole for each mole of epihalohydrin. The temperature of the reaction mixture may be maintained at 20° C. or up to 80° C. during the addition of the epihalohydrin, but a preferred range has been found to be around 40–60° C. The slightly exothermic nature of the reaction usually makes external cooling necessary to maintain the desired temperature. Stirring is advantageously continued until after the exothermic reaction has subsided and the temperature has once more dropped to about room temperature. The alkaline material, preferably an aqueous solution of sodium or potassium hydroxide, is then added to the reaction mixture, now cooled somewhat below room temperature and stirred vigorously. After allowing sufficient time for the completion of the reaction, the crude product may be isolated by any convenient method prior to purification. The latter step is accomplished preferably by distillation after removal of water by drying the crude compound over a solid drying agent, preferably an alkaline drying agent, such as solid caustic alkali, crystalline sodium and calcium aluminum silicates (available commercially from The Linde Air Products Company under the name "Molecular Sieves"); anhydrous magnesium sulfate, anhydrous calcium sulfate and the like.

A mixture of 1,2-alkylenimines may be employed as the alkylenimine component of the reaction mixture, in which case the product will be a mixture of N-(2,3-epoxypropyl)-2-alkylaziridines.

The organic co-reactants which contain a plurality of active hydrogen atoms in each molecule and which are capable of copolymerizing with or being chain extended or cross-linked by the N-(2,3-epoxypropyl)-2-alkylaziridines include polyfunctional carboxylic acids such as adipic acid, azelaic acid, sebacic acid, trimesic acid, benzene tetracarboxylic acid, etc., and polyfunctional mercaptans such as hexamethylene dimercaptan, xylylene dimercaptan, etc. Other such co-reactants which may themselves be either monomers or polymers, are exemplified under the capitalized and underlined subject headings on this and the following pages.

POLYESTERS

Ordinarily the active hydrogen in polyesters is furnished by carboxyl and hydroxyl groups. Illustrative groups of polyesters which are polyfunctional with respect to active hydrogen are as follows:

I. Branched polyesters may be prepared from a polyfunctional alcohol, one or more diols and one or more dibasic acids. Some examples of these polyesters are the reaction products of:

Glycerol, 2,2-dimethyl-1,3-propanediol and succinic acid;
Trimethylolpropane, diethylene glycol, and adipic acid;
Trimethylolpropane, neopentyl glycol and diglycolic acid;
Glycerol, diethylene glycol, and adipic acid;
Trimethylolpropane, polyethylene glycol and thiadipropionic acid;
Trimethylolethane, diethylene glycol, polyethylene glycol and oxydipropionic acid;
Trimethylolpropane, 2,2-bis[4-(2-hydroxypropoxy)phenyl]propane and azelaic acid;
Mannitol, diethylene glycol and diglycolic acid;
Pentaerythritol, propylene glycol, sebacic acid, and isophthalic acid; and
Trimethylolpropane, 3-methyl-3-azopentandiol-1,5 and azelaic acid.

Branch polyesters may also be prepared from a polyfunctional acid, one or more dials and one or more dibasic acids. Some examples of these polyesters are the reaction products of:

Trimesic acid, diethylene glycol and adipic acid;
Citric acid, polyethylene glycol and adipic acid;
Citric acid, di-1,4-(2-hydroxypropoxy)benzene, fumaric acid and sebacic acid;
Benzene tetracarboxylic acid, propylene glycol, 1,4-butylene glycol and adipic acid;
Benzene tetracarboxylic acid, polyethylene glycol, and maleic acid; and Benzene tetracarboxylic acid, 2,2-diethyl 1,3-propanediol, and diglycolic acid.

A further method of preparing branched polyesters is by reacting a polyfunctional acid with a hydroxy or an amino acid. Some examples of these polyesters are the reaction products of: benzene tetracarboxylic acid and 12-hydroxy stearic acid;

Benzene tetracarboxylic acid and N-methyl β-alanine;
Polyacrylic acid and hydracrylic acid;
Polyacrylic acid and N-methyl-omega-aminoundecanoic acid;
Polymethacrylic acid and N-methyl-6-amino caproic acid.

The preparation of some polyesters of this type may be accomplished by the following procedures. Of these first five (A through E) illustrate the use of a polyfunctional alcohol, one or more diols and one or more dibasic acids, the sixth (F) illustrates the use of a polyfunctional acid, one or more diols and one or more dibasic acids and the seventh (G) illustrates the use of a polyfunctional acid and a hydroxy or an amino acid as starting materials for the desired products.

A. Bulk preparation of polyester of adipic acid, diethylene glycol and trimethylolpropane.

About 584 parts of adipic acid, 388 parts of diethylene glycol, 12.44 parts of trimethylolpropane and 2 parts of a triphenyl phosphite catalyst are charged to a stirred flask. The reaction is carried out at 160–180° C. in a nitrogen atmosphere. When approximately the theoretical amount of water of esterification has been driven off (indicating that the reaction is essentially complete) the pressure is reduced gradually and the temperature is increased to 220° C. The reaction is terminated when the acid number of the melt reaches 27.9. The characteristics of the polyester as as follows:

Inherent viscosity in acetone _____ 0.13
Number of average degree of polymerization ($\overline{X}_n$) _ 50
Molecular weight ($\overline{M}_n$) _____ 5000
Free carboxyl groups per molecule (average) ____ 2.6
Acid concentration (milliequivalents per gram) ___ 050

B. Bulk preparation of a polyester of adipic acid, diethylene glycol and glycerol.

About 146 grams (1.0 mole) of adipic acid, 85.5 grams (0.80 mole) of diethylene glycol, and 9.2 grams (0.10 mole) of glycerol are charged to a stirred 250 milliliter flask. The reaction is carried out at 160–180° C. in a nitrogen atmosphere. The bulk of the water of esterification is removed (by distillation) within the first four hours and the remainder is then removed by lowering the pressure and raising the temperature of the reaction to 220° C. About two hundred grams of polymer are recovered. Its characteristics are as follows:

Inherent viscosity in acetone _____ .08
Acid number (milligrams of potassium hydroxide per gram of sample) _____ 58.0
Number of average degree of polymerization ($\overline{X}_n$) _ 20
Molecular weight ($\overline{M}_n$) _____ 2000
Free carboxyl groups per molecule (average) ____ 3.0
Acid concentration (milliequivalents per gram) ___ 1.04

C. Azeotropic preparation of a polyester of sebacic acid, neopentyl glycol and trimethylol propane.

About 202 parts of sebacic acid, 89.4 parts of neopentyl glycol and 3.7 parts of trimethylol propane are charged to a flask which is fitted with a Barrett trap, a thermometer which is immersed in the liquid reaction mixture and a reflux condenser. A volume of benzene approximately equal to that of the reaction mixture is added and the liquid is heated to reflux. The refluxing is continued (the water of condensation being removed by the Barrett trap as it is formed) until the distillate becomes clear and the acid number of the polymer approaches the theoretical value. The benzene is then removed by distillation. The characteristics of this polyester are as follows:

Number of average degree of polymerization ($\overline{X}_n$) __ 23
Free carboxyl groups per molecule (average) _____ 2.3
Acid concentration (milliequivalents per gram) ____ .94
Acid number _____ 53

D. Azeotropic preparation of a polyester of azelaic acid, oxypropylated bis-phenol A and trimethylol propane.

About 188 grams (1 mole) of azelaic acid, 172 grams (0.5 mole) of 2,2-bis[4-(2-hydroxypropoxy)phenyl]propane, 22.4 grams (0.116 mole) of trimethylolpropane, 1.0 gram of paratoluene sulfonic acid and 300 milliliters of benzene are charged to a 1 liter flask equipped with a Starke-Dean water-separator and a condenser. The mixture is heated at reflux until the theoretical amount of water has been removed. The characteristics of the polyester are as follows:

Number average degree of polymerization ($\overline{X}_n$) ___ 10
Free carboxyl groups per molecule (average) _____ 3.0
Acid concentration (milliequivalents per gram) ____ 1.43
Acid number _____ 80

E. Bulk preparation of polyester of isosebacic acid, neopentyl glycol and trimethylolpropane.

About 515 parts of "isosebacic" acid (a product of the U.S. Industrial Chemical Company consisting of 72–80% of 2-ethyl suberic acid, 12–18% of 2,5-diethyladipic acid and 6–10% of n-sebacic acid), 221 parts of neopentyl glycol and 13.5 parts of trimethylolpropane are charged to a stirred flask. The reaction is carried out at approximately 160–180° C. in a nitrogen atmosphere. When approximately the theoretical amount of water of estification has been driven off (indicating that the reaction is essentially completed) the pressure is reduced gradually and the temperature is increased to 250° C. The reaction is terminated when the acid number of the melt reaches 60.6. The viscosity of the resulting polyester is found to be 3700 centipoises at 150° F. when measured with a Brookfield viscometer.

F. The bulk preparation of the polyester of trimesic acid, diethylene glycol and adipic acid.

About 263 parts of adipic acid, 191 parts of diethylene glycol, 21 parts of trimesic acid and 650 parts of benzene are charged to a stirred flask and refluxed with agitation for about 6 hours. The water of condensation which forms during the reaction is removed in a Barrett trap. The benzene is removed at the end of the reaction leaving a mobile liquid polyester of which the acid number is 42 (acid concentration 0.75 milliequivalents per gram).

G. Bulk preparation of the polyester of γ-methyl-ε-caprolactone and benzene tetracarboxylic acid.

About 2500 parts of γ-methyl-ε-caprolactone and 127 parts of benzene tetracarboxylic acid are heated together for 20 hours at 170° C. The resulting polymer is a viscous liquid with an acid number of 43 and an acid concentration of 0.77 milliequivalents per gram.

II. Dianhydride-extended polyesters. Some examples are the reaction products of:

A linear, hydroxyl-terminated polydiethylene glycol adipate extended with pyromellitic dianhydride;
A linear, hydroxyl-terminated polyester of 1,4-butylene glycol and diglycolic acid extended with 1,4,5,8-naphthalenetetracarboxylic dianhydride; and
A linear, hydroxyl-terminated polyester of polypropylene glycol and isophthalic acid extended with cyclohexanetetracarboxylic dianhydride.

A polyester of this type may be prepared as follows:

A glycol-terminated linear polyester is prepared by heating together 212 parts (2.0 moles) of diethylene glycol and 146 parts (1.0 mole) of adipic acid until the calculated amount of water is removed. The resulting prepolymer is condensed further by heating to 220° C. under a high vacuum and distillation of diethylene glycol until the inherent viscosity in acetone is about 0.06.

One hundred parts of the above hydroxyl-terminated polyester are heated with ten parts of pyromellitic dianhydride at 150° C. until the inherent viscosity in acetone amounts to about 0.10 and the acid number is 56 milligrams of KOH per gram.

III. Anhydride-extended polyether glycols. Some examples are the reaction products of dianhydrides with polyether glycols such as:

Pyromellitic dianhydride and polybutylene glycol;
1,4,5,8-naphthalenetetracarboxylic dianhydride and polypropylene glycol; and
Cyclohexanetetracarboxylic dianhydride and poly - 3-methyl-1,4-butylene glycol.

Anhydride-extended polyether glycols may also be prepared from branched polyether alcohols and cyclic acid anhydrides. Some examples are the reaction products of:

The reaction product of propylene oxide and ethylene diamine with glutaconic anhydride;
The reaction product of pentaerythritol with ethylene and propylene oxide with maleic anhydride; and
A glycerine, ethylene oxide, propylene oxide reaction product of the formula:

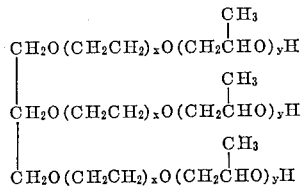

and succinic anhydride, wherein $x$ is a number from 1 to about 20 and $y$ is a number from 1 to about 100.

The preparation of some polyesters of this type may be accomplished by the following procedures. Of these, the first one (A) illustrates the use of a polyether glycol and a dianhydride and the second and third (B and C) illustrate the use of a branched polyether alcohol and a cyclic acid anhydride as starting materials for the desired products.

A. Preparation of a polyether ester of a hydroxyl-terminated polyether of butylene oxide and pyromellitic dianhydride.

About 100 parts of Dow Polyglycol B-1000 (a hydroxyl-terminated polyether of butylene oxide of an average molecular weight of 1000) is stirred and heated with 21.8 parts of pyromellitic dianhydride until the mixture reaches a viscosity of approximately 700 poises.

B. Preparation of a polyether-ester of a hydroxyl-terminated polyether and succinic anhydride.

185 grams of a reaction product of glycerine, ethylene oxide, and propylene oxide of the general formula:

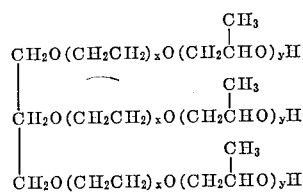

having an average molecular weight of about 1100 (Dow 15-100), 300 cc. of benzene and 28 grams of succinic anhydride are charged to a 1-liter stirred flask which is fitted with a reflux condenser. The mixture is stirred and reacted for 8 hours at reflux. A small amount of water of condensation which forms during the reaction is removed in a Barrett trap. The benzene is removed by distillation and the resulting polyether is a mobile, light yellow liquid. The acid number of the polyether is found to be 69.6.

C. Preparation of a polyether-ester of a hydroxyl-terminated polyether and succinic anhydride.

270 parts of a reaction product of ethylene oxide, propylene oxide and ethylene diamine of an average molecular weight of 2700 and represented by the formula:

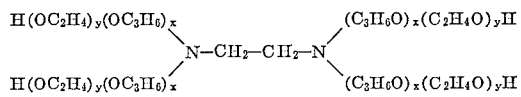

are mixed with 40 parts of succinic anhydride and a catalytic amount of pyridine. The mixture is heated for four hours at 125° C. at which time the acid number has reached about 70. The polymer contains 4 carboxyl groups per molecule and the acid content is 1.25 milliequivalents per gram.

POLYMERIZED HIGHER FATTY ACIDS

Illustrative of the polymerized higher fatty acids which may be employed herein are, for example, a dibasic dimerized linoleic acid product of approximately 600 molecular weight which typically has a dimer:trimer acid ratio of about 95:5 percent, an acid number of 188–193, a saponification value of 194–198, a neutralization equivalent of 292–298 and a viscosity at 25° C. of approximately 5,600 centistokes (available from Emery Industries, Inc., of Cincinnati, Ohio, under the trade designation "Emery 3079-S" polymerized fatty acid); a tribasic trimerized linoleic acid product of an average molecular weight of approximately 845 which varies in trimer acid content from about 70 to 85 percent (the remainder being composed essentially of dimer acid) and which typically has an acid number of 183–188, a saponification value of 192–198, a neutralization equivalent of 299–306 and a pour point of about 13° C. (available from Emery Industries, Inc., under the trade designation "Emery 3055-S" polymerized fatty acid); a tribasic trimerized higher fatty acid product of approximately 900 molecular weight which typically has a trimer acid content of 90–95 percent (the balance being composed essentially of dibasic acid), an acid number of 183–188, a saponification value of 192–198, a neutralization equivalent of 299–306 and a pour point of about 13° C. (available commercially from Emery Industries, Inc., under the trade desgination "Emery 3162-S" polymerized fatty acid); a liquid tribasic trimerized higher fatty acid product which has a relatively low iodine value, a neutralization equivalent of about 311 and a calculated acid number of 180 (available from Emery Industries, Inc., under the trade designation "Emery 3130-R" polymerized fatty acid); a highly viscous liquid black low polymeric product of a higher fatty acid which has a neutralization equivalent of 267 and a calculated acid number of 210 (available from Emery Industries, Inc., under the trade designation "Emery 3215-R" polymerized fatty acid); a viscous, liquid purified, dimerized higher fatty acid product which has a relatively low iodine value, a neutralization equivalent of about 309 and a calculated acid number of 182 (available from Emery Industries, Inc., under the trade designation "Emery 3244-R" polymerized fatty acid); a highly viscous light yellow colored liquid tetrameric higher fatty acid product which has an acid number of about 170 and an average molecular weight of about 700 (obtainable from the Archer-Daniels-Midland Company under the trade designation "4308-F" polymerized fatty acid); etc.

While the structures of these polymerized acids are not definitely known it has been postulated that the structures of the dimer and trimer of linoleic acid are as follows:

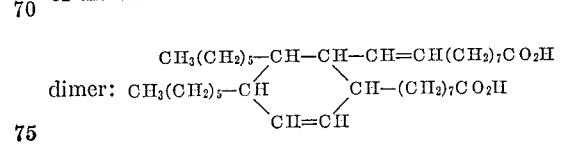

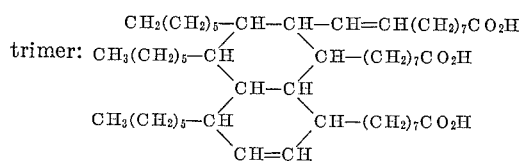

It is to be understood that the accuracy of these proposed structures and of the mechanism of polymerization of linoleic acid and other fatty acids in no way affect the scope of the present invention.

Other higher fatty acids from which low polymers suitable for use in the present invention may be prepared include those acids present in the mixtures of fatty acids derived from soybean oil, peanut oil, linseed oil, dehydrated castor oil, corn oil, tung oil, cottonseed oil, sardine oil, tall oil and other oils of the drying or semi-drying type. The primary constituents of these and other oils of this type are $C_{16}$ to $C_{18}$ unsaturated fatty acids together with lesser amounts of saturated acids of the same chain lengths. The total range of chain lengths of the fatty acid constituents of such oils is from about $C_{14}$ to $C_{22}$.

These polymerized polyene higher fatty acids are additionally characterized by being substantially liquid, that is liquid or semi-solid at ordinary temperatures, or easily liquefied by moderate warming. Furthermore, it is of course possible to use together mixtures of polymerized polyene higher fatty acids as well as individual polymers in admixture with small amounts of unpolymerized saturated or unsaturated higher fatty acids to copolymerize with the aziridine compounds. In fact, less pure commercially available polymerized polyene higher fatty acid products commonly are found to contain an amount of unpolymerized material and these are quite suitable for use in the compositions herein described.

If desired, the polymerized polyene higher fatty acids can be subjected to hydrogenation to remove residual unsaturation in whole or part. Resinous compositions prepared by employing with these the N-(2,3-epoxypropyl)-aziridine compounds of the invention exhibit enhanced electrical and mechanical properties, especially at higher operating temperatures.

POLYALKYLENE POLYSULFIDE PREPOLYMERS

Regarding the term "polyalkylene polysulfide prepolymers" as used herein, reference is made to those polymers described in U.S. Patents Nos. 1,890,191, 2,049,974, 2,100,351, 2,216,044, 2,466,963 and 2,474,859 which illustrate the type of prepolymer useful for the purposes of the invention.. The various polyalkylene polysulfide prepolymers are produced in the form of liquids, solids and dispersions and are sometimes referred to as "polyfunctional liquid mercaptans" (when in liquid form).

Although the invention can be used with any of the polyalkylene polysulfide prepolymers, whether in liquid or solid form, particular attention will be drawn, for purposes of illustration, to the uses of the invention with the liquid polymers.

Commercially important polyalkylene polysulfide prepolymers (some of which are distributed under the registered trademark "Thiokol"), are derived from various polyfunctional organic halides and frequently from mixtures of such halides, reacted with an alkali metal polysulfide and thereafter treated in a particular manner as described in the earlier patents cited above.

The polyalkylene polysulfide prepolymers which may be utilized in the present invention may exist in the form of thin, syrupy liquids to thick, viscous liquids to solids. Their molecular weights may vary from about 200 to about 30,000 or higher. Normally liquid polymers are preferred for use in the present invention, such liquid polymers having an average molecular weight of from about 500 to about 20,000 or higher, as determined in the familiar manner by means of end group titration. Liquid polymers in this range are viscous liquids at ordinary temperatures, have the consistency of thin syrup or molasses, and a viscosity of between about 3 and 1,500 poises. The degree of copolymerization employed in the manufacture of the polyalkylene polysulfide prepolymer and the average molecular weight thereof influences the physical properties. Generally, the use of a liquid polyalkylene polysulfide prepolymer having a lower average molecular weight (say below 3000) tends to produce harder bodies than a liquid polymer having a higher average molecular weight, the latter tending to produce bodies having a lower Shore hardness but better tear resistance. These tendencies are of course particularly strong in copolymers of the invention in which a relatively large amount of the polyalkylene polysulfide prepolymer is used with respect to the N-(2,3-epoxypropyl)-aziridine.

The polyalkylene polysulfide prepolymers contain recurring disulfide linkages (—S—S—) and are polyfunctional with respect to mercaptan groups. They are sometimes represented by the formula:

$$(-R-S-S-R-)_n$$

with the understanding that commercial polysulfide polymers usually contain thiol groups (—SH) but can be replaced in part, if so desired by terminal alkyl, aryl, hydroxyl, allyl and carboxyl groups.

Illustrative of the polyalkylene polysulfide prepolymers are the following products of the Thiokol Corporation of Trenton, N.J.: Thiokol liquid polymer LP–2, a thiol-terminated liquid polymer of bis(ethylene oxy)methane having a viscosity at 25° C. of 350–450 poises, a number average molecular weight of 4,000 and a pour point of 35° F.; Thiokol liquid polymer LP–3, a thiol-terminated liquid polymer of bis(ethylene oxy)methane having a viscosity of 25° C. of 7–12 poises, a number average molecular weight of 1,000 and a pour point of −15° F.; Thiokol liquid polymer LP–32, a thiol-terminated liquid polymer of bis(ethylene oxy)methane have a viscosity at 25° C. of 350–450 poises, a number average molecular weight of 4,000 and a pour point of 45° F.; Thiokol liquid polymer LP–33, a thiol-terminated liquid polymer of bis(ethylene oxy)methane having a viscosity at 25° C. of 13–15.5 poises, a number average molecular weight of 1,000 and a pour point of 5 to 10° F.; Thiokol liquid polymer ZL–205, a liquid polymer of bis(butylene oxy)methane; and Thiokol ST, a thiol-terminated crosslinkable polysulfide crude rubber which has a sulfur rank of 2.25.

POLYFUNCTIONAL AMINES AND AMIDES

Among the aliphatic polyfunctional amines useful as comonomers in the present invention are the polyalkylene polyamines such as ethylene diamine, diethylene triamine, triethylene tetramine, tetraethylene pentamine, trimethylene diamine, tetramethylene diamine, pentamethylene diamine, hexamethylene diamine, asymmetrical N-dimethyl propylene diamine, 1,3-pentamethyl diethylene triamine and asymmetrical N-diethyl propylene diamine 1,3; ethylene oxide-amine adducts such as monohydroxy diethylene triamine and bis-hydroxyethyl diethylene triamine; propylene oxide-amine adducts such as N-(2-hydroxypropyl) ethylene diamine; etc.

Differing from the polyalkylene polyamines, for the purposes of the present invention, primarily in that they have generally lower amine values (which indicates a lower concentration of active hydrogen furnished by amine groups), are the various polyfunctional aliphatic amines which are derived from polymerized unsaturated higher fatty acids of the type hereinbefore described. The low molecular weight polymers of polyene fatty acids of the type previously described can be reacted with polyfunctional amines to form higher molecular weight materials which contain aliphatic amine and amide functional groups. A postulated structure for a product of this type (the reaction product of the dimer of linoleic acid and ethylene diamine) is as follows:

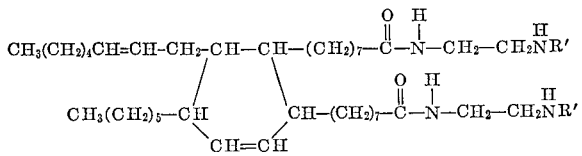

wherein R' is hydrogen or another linoleic acid dimer group. When a dimer of a fatty acid, e.g., of linoleic acid, is condensed with a diamine, solid, thermoplastic materials usually result while if a polyamine is used in place of the diamine, soft or liquid materials usually result. Resins of this general type are disclosed in United States Patent 2,450,940. Amine-terminated polyamides of this type, are available from General Mills, Inc., of Kankakee, Illinois, under the registered trademark "Versamid." Among these products, which are produced by the condensation of polycarboxylic acids with polyamines, are "Versamid" 100, a soft, tacky resin that is semisolid at room temperature, which melts at 43–53° C. and which has an amine value of 83–93; "Versamid" 115, a viscous liquid resin at room temperature which has a viscosity at 40° C. of approximately 500–750 poises (on a Brookfield Viscometer using a No. 6 Spindle and revolving at 4 r.p.m.) and an amine value of 210–230; "Versamid" 125, a fluid resin at room temperature which is reported to have a viscosity at 40° C. of approximately 80–120 poises (on a Brookfield Viscometer using a No. 6 Spindle and revolving at 4 r.p.m.) and an amine value of 290–320; and "Versamid" XD-140, derived from dimeric polyene higher fatty acids of the type described hereinabove, which is a liquid at room temperature which has a viscosity at 25° C. of approximately 130±30 poises (on a Brookfield Viscometer using a No. 6 Spindle and revolving at 4 r.p.m.) and an amine value of approximately 325–360.

Aliphatic polyfunctional amines which contain no amide groups may be prepared from the polymerized polyene fatty acids, for example, by dehydration of the ammonium salt of the acid followed by hydrogenation of the resulting amide, during which the residual unsaturation may be partly or wholly removed. A postulated structure for a product of this reaction is exemplified by the following:

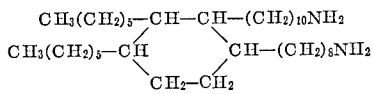

Polyfunctional amines of this type, which can be obtained from Emery Industries, Inc., of Cincinnati, Ohio, are "Emery 3154-R" amine, a liquid resin at room temperature which has an amine value of approximately 177; and "Emery 654–27–R" amine, which is also liquid at room temperature and which has an amine value of approximately 155. These and the above amide group-containing polyfunctional amines can be designated generically as polyfunctional amines derived from polymers of higher fatty acids.

Mixtures of the fatty acid amine polymers may be used if properties intermediate of two of them are desired, and in fact the commercially available products are themselves mixtures and commonly contain an amount of unpolymerized material, but this does not destroy their utility for use in the present invention.

Among the aromatic polyfunctional amines which are useful in preparing the copolymers of the invention are methylene-bis-o-chloroaniline (amine value 420); 4,4'-diamino diphenylsulfone (amine value 450); 4-isopropyl-m-phenylene-diamine (amine value 740); m-phenylene diamine (amine value 1004); and the liquid eutectic mixture of m-phenylene diamine with 4-isopropyl-m-phenylene diamine (available commercially from the E. I. du Pont Company, amine value approximately 800–900); as well as 4,4'-methylene dianiline; 2,6-diamino pyridine; 4-chloro-o-phenylene diamine; N(2-aminoethyl) pyridine; etc.

In addition the alicyclic polyfunctional amines, such as menthane diamine and araliphatic polyfunctional amines such as m-xylylene diamine, are also useful in preparing the copolymers of the invention.

ACRYLIC ADDITION COPOLYMERS

Among the acrylic addition copolymers which are polyfunctional with respect to active hydrogen are copolymers of: acrylic acid and butadiene; and partially hydrolyzed copolymers of maleic anhydride and butyl acrylate; butyl acrylate, 2-cyanoethyl acrylate and acrylic acid; methacrylic acid and butadiene; acrylic acid and isoprene; acrylic acid and chloroprene; methacrylic acid and isoprene; cinnamic acid and butadiene; crotonic acid and butadiene; acrylic acid and methoxyethyl acrylate; and acrylic acid, acrylonitrile and butadiene.

Two representative copolymers of this type may be prepared as follows:

A. A copolymer of methoxyethyl acrylate and acrylic acid.

About 25 parts of methoxyethyl acrylate, 0.25 part of acrylic acid, 0.50 part of tertiary dodecyl mercaptan and 0.10 part of tertiary butyl peroxide are sealed in a heavy-walled glass ampoule in the absence of air. The sealed ampoule is held at 100° C. (with agitation) for 20 hours. A liquid polymer is obtained which has an inherent viscosity in acetone of 0.11 and an acid number of 7.5.

B. A copolymer of butadiene and acrylic acid.

About 90 parts by weight of butadiene, 10 parts of acrylic acid, 180 parts of water, 5 parts of sodium lauryl sulfate, 5 parts of sodium sulfate, one part of potassium persulfate, and 6 parts of commercial grade tertiary dodecyl mercaptan are charged into a heavy walled pressure vessel. The vessel is sealed, placed in a water bath at 55° C. and agitated for 18–20 hours at which time the polymerization is 75–80% complete. The unreacted butadiene is bled off and the latex is coagulated by the addition of a 5% solution of barium chloride. The coagulated polymer is washed by agitating it with a large amount of water, and then blended with 1½ parts of an antioxidant. The liquid polymer is dried by passing it over a hot drum drier. The product is a viscous liquid with an inherent viscosity of 0.19 and an acid number of 49.

POLYHYDROXY COMPOUNDS AND POLYMERS

Among the polyhydroxy compounds and polymers useful as coreactants in the copolymers of the present case are ethylene glycol, glycerine, sorbitol, polyvinyl alcohol, trimethylolpropane, trimethylolethane, mannitol, pentaerythritol, etc.

The compositions formed by intermixing the organic monomers or polymers which contain a plurality of active hydrogen atoms in each molecule (sometimes called "active hydrogen-containing co-reactants" or simply "co-reactants" herein for convenience) with the N-(2,3-epoxypropyl)-2-aziridines of the invention (sometimes called "the aziridines" herein for convenience) are ordinarily initially liquid, or semi-solid, substantially 100 percent solids-forming mixtures. Such compositions are highly advantageous because they exhibit little or no shrinkage upon final curing. Furthermore, the liquid nature of these mixtures is important in compounding and molding, i.e., simple mixing equipment may in most instances be used in place of ball mills and simple open molds may be used in place of high pressure and/or high temperature molds. Similarly, the liquid form of the aziridines allows the co-reactants to be more easily dispersed into them, although it is also possible when desired to put the active hydrogen-containing coreactants into solution with compatible volatile solvents and to mix this solution with the aziridine. The solvent can then be removed, as by evaporation. Additionally, no gases are given off by the solvent-free systems during curing, whereby bubble-free resins are readily obtained. When cured, the compositions of the invention retain useful mechanical properties at relatively high temperatures.

As noted, the polymer-producing composition provided by the aziridine, if a homopolymer is to be produced (preferably with a suitable catalyst added) or, in the case of copolymer preparation, by the admixture of the aziridines and the active hydrogen-containing co-reactants, are generally speaking, when first prepared, substantially liquid or viscous, semi-solid substances and these can be compounded with fillers and the like to produce more or less viscous products. (By the term "substantially liquid" as used throughout the specification it is meant that the substance is capable of flowing. Materials of very high viscosity may require warming to facilitate handling.) The uncured systems may be utilized, for example, by pouring or otherwise introducing them into molds surrounding circuits, wires, etc. which are to be encapsulated. The compositions undergo spontaneous curing producing cured polymer systems which provide firmly adhered, chemically inert, moisture and solvent resistant encapsulations having useful electrical properties. Mold release agents are commonly utilized to prevent adhesion when the compositions are used as molds.

For many applications, compositions consisting solely of the N-(2,3-epoxypropyl)-2-alkylaziridine and the active hydrogen-containing co-reactant will be preferred, e.g., in electrical encapsulations, since the resulting electrical properties are often best when no adjuvants are included. In other cases it may be found desirable to load or extend the resinous compositions, e.g. by the addition of particulate or fibrous fillers such as fuller's earth, quartz flour, asbestos, glass filaments, etc. or to otherwise modify the electrical, physical or chemical properties of the resin by incorporation of plasticizers, colorants, resins (e.g., epoxy resins, the rings of which may be opened by the active hydrogen furnished by an active hydrogen-containing co-reactant, such as a polyamine or a polyester), conductive material such as carbon or metal powders, etc. which may be considered as adjuvants and the like. The finer fillers are good reinforcing agents for these systems, neutral fillers such as calcium carbonate, iron oxide and titanium dioxide being preferred. Acidic fillers such as certain carbon blacks and silicas can also be used if proper adjustments are made for pH (e.g., addition of increased amounts of N-(2,3-epoxypropyl)-2-alkylaziridine).

Among the other adjuvants which may be used with the compositions of the invention are solvents, e.g., hydrocarbons such as heptane, benzene, toluene and xylene, chlorinated solvents such as carbon tetrachloride, chloroform and trichloroethylene, ketones such as acetone and methyl ethyl ketone, and alcohols such as isopropanol. Such solvents can be used to dilute the compositions, e.g., for use as coatings or to moderate the polymerization reaction. Antioxidants, such as symmetrical di-beta-naphthyl paraphenylene diamine (available under the trade designation "Agerite White" from the R. T. Vanderbilt Co.), certain liquid phenol-formaldehyde A-stage resins (e.g., "Stabilite White" liquid antioxidant, a product of C. P. Hall Co. of Akron, Ohio), diorthotolyl ethylene diamine (available under the trade designation "Stabilite Alba" from C. P. Hall Co.), etc., may also be added to the compositions of the invention.

Broadly, the polymerizable compositions which produce the copolymers of the invention are prepared by simple admixture of the components thereof. While an amount of the co-reactant, the active hydrogen content of which is equivalent stoichiometrically to the number of aziridine and oxirane rings present in the selected N-(2,3-epoxypropyl)-2-alkylaziridine may be employed, more complete cures are effected when amounts greater than stoichiometric amounts of the epoxy aziridine compound are employed, ranging upwards from 10 to 100 percent greater; and it is ordinarily preferred that about 20 to 40 percent excesses of the theoretical stoichiometric equivalent be used in order to compensate for any inerts in the epoxy aziridine compound, its adsorption on and reactivity with fillers, etc. The initiation of and the rate of cure are dependent to a degree upon the temperature, the viscosity of the mixture and the amount of the particular aziridine which is employed. By maintaining the mixture at low temperatures, for example, about 0–10°C., the polymerization is retarded and increased pot life is obtained.

In order more clearly to disclose the nature of the present invention, several examples illustrating the preparation of the N-(2,3-epoxypropyl)-2-alkylaziridine monomers and of polymeric compositions thereof will now be described. It should be understood, however, that this is done solely by way of example of the best mode presently contemplated for carrying out the invention, and is intended neither to delineate the scope of the invention nor to limit the ambit of the appended claims. All parts are by weight unless otherwise designated.

*Example 1*

To a 200 ml. three necked flask equipped with a thermometer, stirrer, condenser and dropping funnel are added about 14.2 grams (0.2 mole) of 1,2-butylenimine and 10 ml. of water. This solution is stirred and heated to 40° C., and 18.5 grams (0.2 mole) of epichlorohydrin are then added dropwise over a period of approximately 15 minutes. During the addition a slightly exothermic reaction takes place and occasional cooling with cold water is necessary to maintain a reaction temperature of 40–45° C. Stirring is continued for an additional 2½ hours, allowing the reaction temperature to drop to room temperature after the exotherm subsides. The mixture is then cooled to 15° C. and a solution of 12 grams of sodium hydroxide in 20 ml. of water is added with cooling and stirring. The stirring is continued for an additional 2 hours, keeping the temperature below 20° C. The reaction mixture is transferred to a sepatory funnel and the top layer of crude product separated. About 40 ml. of water are added to the remaining aqueous layer, which is then extracted several times with equal volumes of ether. The combined top crude product layer and ether extracts are dried over dry solid sodium hydroxide at 0° C. and distilled. The fraction distilling at 60–75° C. and 28 mm. of mercury pressure is collected and constitutes 16.7 grams of desired product for a yield of 66% of the theoretical amount. Redistillation of a sample of the once distilled product provides an analytically pure sample of N-(2,3-epoxypropyl)-2-ethylaziridine, having a boiling point of 67.5° C. at 23 mm. mercury pressure. Upon analysis of this sample, which should contain 11.02% nitrogen and 0.0% chlorine when calculated for $C_7H_{13}HO$, values of 11.00% nitrogen and 0.0% chlorine are obtained, showing that all chloride has been removed from the product. Infrared absorption analysis verifies the absence of NH and OH bonds.

*Example 2*

To a 200 ml. three necked flask equipped with thermometer, stirrer, condenser, and dropping funnel are added 11.4 grams (0.2 mole) of 1,2-propylenimine and 10 ml. of water. Then 18.5 grams (0.2 mole) of epichlorohydrin are added dropwise with stirring and cooling over a period of approximately 15 minutes. The reaction temperature is maintained at 20–25° C., with stirring continued for 6 hours. It is then cooled to 15° C. and a solution of 12 grams of sodium hydroxide in 20 ml. of water is added with cooling and stirring. The temperature is maintained at 15–20° C. for 2 hours and the reaction mixture then worked up as in Example 1. A 41.5% yield of N-(2,3-epoxypropyl)-2-methylaziridine is obtained distilling at 55–56° C. at 17 mm. mercury pressure. Upon analysis of the purified product, the nitrogen content is found to be 12.4% (which is identical with the calculated value for $C_6H_{11}NO$) and has $n_D^{25°}=1.4356$.

Example 3

The product, N-(2,3-epoxypropyl)-2,2-dimethylaziridine, is obtained using the same procedure described under Examples 1 and 2 above employing an equivalent amount of 2-methyl-1,2-n-propylenimine as the alkylenimine. The yield is 12.1 grams of N-(2,3-epoxypropyl)-2,2-dimethylaziridine or 48% of theoretical. The product is a water white liquid product boiling at 65–66° C. at 15 mm. mercury pressure and has $n_D^{25°}=1.4409$.

Example 4

A homopolymer of N-(2,3-epoxypropyl)-2-ethylaziridine is prepared by adding to the monomer produced in accordance with Example 1, 1% by weight of boron trifluoride diethyl ether complex ($BF_3 \cdot (C_2H_5)_2O$) as a catalyst using appropriate cooling means to dissipate the heat of polymerization. A viscous polymer quickly forms. Heating this polymer to 140° C. for one hour produces a hard, clear, resinous body. This polymer is useful as a protective and decorative coating for various substrates, e.g. wood, as a cement for mounting glass elements in an optical system and as an encapsulating resin for electronic circuits.

Example 5

A crosslinked polymer of the product of Example 1 with a carboxyl-terminated polyester is produced as follows:

About 0.76 grams of N-(2,3-epoxypropyl)-2-ethylaziridine are mixed with 1.31 grams of trimethylolethane succinate (prepared from 3 moles of succinic anhydride and 1 mole of trimethylolethane) and allowed to stand at room temperature. After 20–22 hours, a hard, bubble-free, insoluble resin forms which is useful in the casting, encapsulating and laminating fields as well as in the field of protective coatings.

Following the procedure of Example 4 hereinabove, clear, hard homopolymers of N-(2,3-epoxypropyl)-2,2-dimethylaziridine and N-(2,3-epoxypropyl)-2 methylaziridine are formed. When these monomers are used in the procedure of Example 5 instead of N-(2,3-epoxypropyl)-2-ethylaziridine, similar hard, insoluble resins are produced.

Example 6

The reaction of the monomeric product of Example 1 with a mixture of linear and non-linear polyesters to give an elastomer is carried out as follows:

The three rubbers of which the preparation is set out in Table I, below, are prepared by mixing a liquid polyester with a composition of varying proportions of trimethylolethane succinate and N-(2,3-epoxypropyl)-2-ethylaziridine to produce separate lots A, B and C.

TABLE I

| Lot | A | B | C |
| --- | --- | --- | --- |
| Liquid diethylenglycol adipate polyester (Acid Number 61) (Morton-Withers Co.), grams | 9.2 | 9.2 | 9.2 |
| Trimethylolethanesuccinate, grams | 1.97 | 0.98 | 0.48 |
| N-(2,3-epoxypropyl)-2-ethylaziridine, grams | 2.15 | 1.53 | 1.2 |

Lots A, B and C are cured for 6 hours at 250° F. and the resulting rubbers compared by sealant performance tests with a commercial Thiokol-based fillet sealant (based upon Thiokol liquid polymer LP–2 and containing fillers, curing agents and the like to produce an elastomer). The results which are disclosed in Table II, below, demonstrate the utility of these copolymers of N-(2,3-epoxypropyl)-2-ethylaziridine as sealants.

TABLE II

| Test Results | Sealant | | | |
| --- | --- | --- | --- | --- |
|  | A | B | C | Thiokol Based |
| Tensile strength, p.s.i. | 140 | 75 | 100 | 160 |
| Elongation, percent | 200 | 200 | 200 | 155 |
| Break Set, percent | 0 | 0 | 0 | 0 |
| Impact brittle point, ° F. (ASTM D-764-52T) | -42 | -40 | -37 | -40 |
| Percent Volume Swell in 70% Isooctane-30% Toluene fuel for 48 hours, at 180° F. | 15 | 23 | 15 | 9 |
| Air Aging Cycle 96 hrs. at 350° F., weigt loss, percent | 17 | 15 | 20 | 50 |

About 0.635 part of N-(2,3-epoxypropyl)-2-ethylaziridine are mixed at room temperature with 10.2 parts of a carboxyl-terminated polyester having an acid number of 55 and a viscosity of 44,000 centipoises at 150° F., said polyester being composed of 0.4 moles of isophthalic acid, 0.8 mole of isosebacic acid (a product of the U.S. Industrial Chemical Co. consisting of 72–80% of 2-ethylsuberic acid, 12–18% of 2,5-diethyladipic acid and 6–10% of n-sebacic acid), 0.9 mole of propylene glycol and 0.1 mole of glycerol. When this mixture is warmed with stirring, it forms a compatible liquid resin which evenly fills the mold which contains it. It cures with no appreciable dimensional changes to a cured flexible, tough, transparent resin in two hours at 250° F. A second copolymeric resin lot is prepared utilizing the same constituents, but using 0.825 parts of N-(2,3-epoxypropyl)-2-ethylaziridine to 10.2 parts of polyester. The second lot is also cured for two hours at 250° F. The cured resins are designated lots A and B respectively and are subjected to the following tests:

| Mechanical Tests | Lot | |
| --- | --- | --- |
|  | A | B |
| Tensile Strength, p.s.i. (ASTM D-638-56T) | --- | 172 |
| Elongation, Percent (ASTM D-638-56T) | --- | 230 |
| WATER SENSITIVITY TESTS | | |
| Water Absorption of samples submerged 48 hrs. at 20° C., percent (ASTM D-570) | 3.6 | 1.1 |
| Water Solubility, loss of weight of resin of samples submerged 48 hrs. at 20° C. and then dried in vacuum oven at 80° C., percent | 0.05 | 0.02 |
| ELECTRICAL PROPERTIES | | |
| Volume Resistivity (ohm-cm.) (ASTM D-257-54T): | | |
| 30° C. | 3.9×10¹² | 6.8×10¹² |
| 60° C. | 5.1×10¹⁰ | 1.7×10¹¹ |
| 90° C. | 1.0×10¹⁰ | 2.4×10¹⁰ |
| 105° C. | --- | 2.1×10⁹ |
| Dissipation Factor (D) (ASTM D-150-54T) 60 cycles: | | |
| 30° C. | .022 | .0212 |
| 60° C. | .092 | .0383 |
| 90° C. | .562 | .425 |
| Dielectric Constant (K) (ASTM D-150-54T) 60 cycles: | | |
| 30° C. | 6.15 | 5.9 |
| 60° C. | 5.79 | 5.6 |
| 90° C. | 6.65 | 5.45 |
| Dielectric Strength (ASTM D-149-44): | | |
| Thickness (mils) | .007 | .0065 |
| Volts/mil at 20° C. | 855 | 1078 |

Example 7

About 1.27 parts of N-(2,3-epoxypropyl)-2-ethylaziridine are mixed with 3.14 parts of Emery 3154–R polyfunctional amine at room temperature, a completely compatible solution being formed. The solution is allowed to stand at room temperature for approximately 16 hours and is then heated for 17 hours at 120° C. A clear, flexible, amber colored, cured resin film is obtained which exhibits good adhesion to aluminum. This copolymer is also useful as a protective coating and/or as an adhesive for other common materials of construction such as wood, glass, etc. When used as a protective coating, the mixture of monomers is brushed or otherwise coated on the surface to be covered in a film of desired thickness, and the cure takes place thereafter. In adhesive applications, the mixture is used while still in the uncured state to coat the surfaces to be joined, which are clamped or otherwise held together until the cure is complete.

A second mixture of N-(2,3-epoxypropyl)-2-ethylaziridine, and Emery 3154-R polyfunctional amine is prepared utilizing 1.6 parts of the aziridine to 3.14 parts of the amine. This mixture is also cured for 17 hours at 120° C. At the end of this time the resin is found to have formed a clear, amber colored protective film on the aluminum test panels which is somewhat less flexible than the cured resin of the previous lot (in which the same constituents were used).

Example 8

About 21 parts of N-(2,3-epoxypropyl)-2-ethylaziridine are dissolved in 100 parts of Emery 3055-S polymerized fatty acid and the resulting 100% solids-forming solution is cured to a clear bubble-free and tack-free flexible film by heating for 1 hour at 120° C. The following electrical test data which are obtained from this cured material demonstrate its utility in the electrical encapsulation field.

Electrical properties

Volume resistivity (ohm-cm.),
- 30° C. _____ $5.2 \times 10^{11}$
- 60° C. _____ $5.9 \times 10^{9}$
- 70° C. _____ $1.7 \times 10^{9}$
- 90° C. _____ $6.7 \times 10^{8}$ Dissipation factor (D)—
60 cycles per second, ° C.:
- 30 _____ 0.151
- 60 _____ 0.669
- 70 _____ 0.950

1000 cycles per second, ° C.:
- 30 _____ 0.0955
- 60 _____ 0.123
- 70 _____ 0.141

Dielectric constant (K)—
60 cycles per second, ° C.:
- 30 _____ 5.15
- 60 _____ 7.48
- 70 _____ 9.20

1000 cycles per second, ° C.:
- 30 _____ 4.14
- 60 _____ 6.20
- 70 _____ 6.30

Dielectric strength:
Volts/mil at 20° C. _____ 677

This resin also forms a valuable protective coating when coated as a liquid on various substrates and cured to a clear track-free solid.

Example 9

About 1.27 parts of N-(2,3-epoxypropyl)-2-ethylaziridine are mixed at room temperature with 1.84 parts of Versamid 125 amine-terminated polyamide, the mixture being compatible at room temperature. The solution is still liquid after 16 hours at room temperature, although an increase in the viscosity is noted. A portion of this solution is coated on aluminum test panels and cured for 7 hours at 120° C. to form a tough, flexible, clear, adherent, light yellow colored protective coating.

Example 10

About 1.6 parts of N-(2,3-epoxypropyl)-2-ethylaziridine are mixed with 8.0 parts of Thiokol LP-3 liquid polyalkylene polysulfide prepolymer. The mixture, which is compatible at room temperature, gels after it is heated for 10 minutes at 120° C. A portion of this liquid resin solution is coated on aluminum test panels and is cured for 4 hours at 120° C. At the end of this time the resin is found to have formed a clear, flexible, highly adherent protective coating on the aluminum test panels. The cured copolymer, which is a rubber, may also be cured in the form of sheets from which gaskets, cap seals, etc. may be cut subsequently.

Example 11

About 1.27 parts of N-(2,3-epoxypropyl)-2-ethylaziridine are mixed with 21.76 parts of a liquid butadiene: acrylic acid copolymer which has an equivalent weight per free carboxyl group of 1,088 and in which the ratio of butadiene to acrylic acid is 94:6. This mixture, which is compatible at room temperature, increases in viscosity but remains liquid when allowed to remain at room temperature for 16 hours. After it is heated for 10 minutes at 120° C. it forms a solid but slightly tacky composition. After a cure cycle of 4 hours at 120° C., a completely cured, transparent, amber colored, rubber is obtained. This material can be die-cut into ring shapes suitable for gaskets, cap seals and the like.

Example 12

About 10.2 parts of the carboxyl-terminated polyester of Example 6 hereof which is composed of 0.4 mole of isophthalic acid, 0.8 mole of isosebacic acid, 0.9 mole of propylene glycol and 0.1 mole of glycerol; 0.95 part of "Epon 828" epoxy resin (a liquid condensation polymer of epichlorohydrin and Bisphenol-A having an epoxide equivalent of 175–210, an average molecular weight of 350–400 and viscosity at 25° C. in the range of from 5,000–15,000 centipoises and which is available commercially from the Shell Chemical Company of New York); and 0.41 part of N-(2,3-epoxypropyl)-2-ethylaziridine are mixed with warming until solution occurs. This 100% solid-forming solution is then heated for two hours at 250° F. to give a fully cured flexible, tough transparent resin useful in the encapsulation and coating of electrical components. The following electrical data are obtained from this material:

Electrical properties

Volume resistivity (ohm-cm.)
- 30° C. _____ $6.3 \times 10^{12}$
- 60° C. _____ $2.6 \times 10^{11}$
- 90° C. _____ $2.6 \times 10^{10}$
- 105° C. _____ $2.9 \times 10^{9}$ Dissipation factor (D)—
60 cycles per second, ° C.:
- 30 _____ 0.0195
- 60 _____ 0.0233
- 90 _____ 0.337

Dielectric constant (K)—
60 cycles per second, ° C.:
- 30 _____ 5.72
- 60 _____ 5.45
- 90 _____ 5.42

Dielectric strength
Volts/mil. at 20° C. _____ 845

About 1.9 parts of N-(2,3-epoxypropyl)-2-ethylaziridine are mixed with 0.9 part of glycerine at room temperature to form a completely compatible clear water-white solution. The mixture is coated on wooden test panels which are left at room temperature for 24 hours thereafter and are then brought gradually, over a period of 3 hours, to 120° C. and maintained at that temperature for one hour. At the end of this time, the resin is found to have formed a hard clear protective coating on the panels.

The terms and expressions which have been employed are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:
1. An N-(2,3-epoxypropyl)-2-alkylaziridine compound of the formula

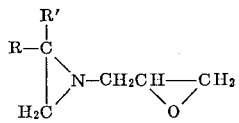

wherein R is an alkyl radical having from one to eight carbon atoms and R' is a member of the group consisting of hydrogen and alkyl radicals having from one to eight carbon atoms.

2. N-(2,3-epoxypropyl)-2,2-dimethylaziridine.
3. N-(2,3-epoxypropyl)-2-methylaziridine.
4. N-(2,3-epoxypropyl)-2-ethylaziridine.
5. A homopolymer of an N-(2,3-epoxypropyl)-2-alkylaziridine compound of the formula:

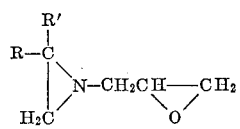

wherein R is an alkyl radical having from one to eight carbon atoms and R' is a member of the group consisting of hydrogen and alkyl radicals having from one to eight carbon atoms.

6. A homopolymer of N-(2,3-epoxypropyl)-2-ethylaziridine.
7. A homopolymer of N-(2,3-epoxypropyl)-2,2-dimethylaziridine.
8. A homopolymer of N-(2,3-epoxypropyl)-2-methylaziridine.
9. A process for producing an N-(2,3-epoxypropyl)-2-alkylaziridine compound of the formula:

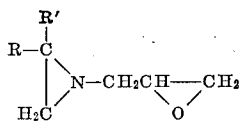

wherein R is an alkyl radical having from 1 to 8 carbon atoms and R' is a member of the class consisting of hydrogen and R, which comprises reacting in the presence of a catalytic amount of water and while maintaining the temperature at from about 20° to 80° C. an epihalohydrin selected from the class consisting of epichlorohydrin, epibromohydrin and epiiodohydrin with an approximately equimolar portion of a compound having the formula:

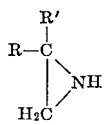

wherein R and R' are as previously defined to form an intermediate compound of the formula:

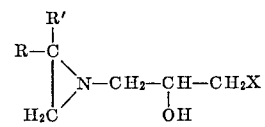

treating said intermediate compound with an at least equimolar amount of a strongly alkaline compound selected from the class consisting of alkali-metal, ammonium and alkaline earth metal hydroxides and isolating said N-(2,3-epoxypropyl)-2-alkylaziridine.

10. A process as defined by claim 9, wherein the epihalohydrin is epichlorohydrin.

References Cited by the Examiner

UNITED STATES PATENTS

| | | | |
|---|---|---|---|
| 1,790,042 | 1/1931 | Eisleb | 260—348 |
| 2,296,225 | 9/1942 | Ulrich | 260—348 |
| 2,475,068 | 7/1949 | Wilson | 260—239 |
| 2,680,109 | 6/1954 | Stevens et al. | 260—2 |
| 2,692,247 | 10/1954 | Graham | 260—42 |
| 2,743,248 | 4/1956 | Lotz | 260—2 |
| 2,854,429 | 9/1958 | De Groote et al. | 260—45 |
| 2,864,790 | 12/1958 | De Groote et al. | 260—45 |
| 2,921,037 | 1/1960 | Andres et al. | 260—2 |
| 2,944,051 | 7/1960 | Graefe | 2660—239 |
| 3,006,912 | 10/1961 | Vierling et al. | 260—348 |

FOREIGN PATENTS

| | | |
|---|---|---|
| 466,344 | 5/1937 | Great Britain. |
| 675,665 | 7/1950 | Great Britain. |
| 664,271 | 1/1952 | Great Britain. |
| 32–3293 | 6/1957 | Japan. |

OTHER REFERENCES

Funke et al., Bull. Soc. Chim., Fr. (1953), pp. 1021–3.
J.A.C.S., vol. 68, p. 1291, July 1946.
Repts., Research Lab., Asahi Glass, Cols. 6, 20–9 (1956).
Richter's Organic Chemistry, vol. 3, p. 4, 1923.

WALTER A. MODANCE, *Primary Examiner.*

IRVING MARCUS, *Examiner.*